(12) United States Patent  
Park et al.

(10) Patent No.: US 9,043,457 B2  
(45) Date of Patent: May 26, 2015

(54) DYNAMIC ADJUSTMENT OF AN INTERRUPT LATENCY THRESHOLD AND A RESOURCE SUPPORTING A PROCESSOR IN A PORTABLE COMPUTING DEVICE

(71) Applicant: QUALCOMM Incorporated, San Diego, CA (US)

(72) Inventors: Hee-Jun Park, San Diego, CA (US); Haobin Luo, San Diego, CA (US); Inho Hwang, San Diego, CA (US); Alex K. Tu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 245 days.

(21) Appl. No.: 13/660,523

(22) Filed: Oct. 25, 2012

(65) Prior Publication Data

US 2014/0122689 A1     May 1, 2014

(51) Int. Cl.
*G06F 15/173* (2006.01)
*G06F 21/62* (2013.01)

(52) U.S. Cl.
CPC ..................................... *G06F 21/62* (2013.01)

(58) Field of Classification Search
USPC ......................................................... 709/224
See application file for complete search history.

(56) References Cited

U.S. PATENT DOCUMENTS

| | | | |
|---|---|---|---|
| 5,307,459 A | | 4/1994 | Petersen et al. |
| 5,319,752 A | | 6/1994 | Petersen et al. |
| 5,996,084 A | * | 11/1999 | Watts ............................ 713/323 |
| 6,889,277 B2 | | 5/2005 | Musumeci |
| 7,107,362 B2 | | 9/2006 | Wheless, Jr. et al. |
| 8,478,922 B2 | * | 7/2013 | Belmar et al. ................ 710/262 |
| 2002/0188749 A1 | | 12/2002 | Gaur |
| 2006/0236002 A1 | | 10/2006 | Valenci |
| 2009/0077394 A1 | | 3/2009 | Tsai et al. |
| 2012/0210032 A1 | | 8/2012 | Wang et al. |

OTHER PUBLICATIONS

Anonymous: "USB in a Nutshell—Chapter 3—USB Protocols", Sep. 28, 2010, XP055092166, Retrieved from the Internet: URL: http://web.archive.org/web/20100928184346/http://www.beyondlogic.org/usbnutshell/usb3.shtml [retrieved on Dec. 9, 2013] p. 1.
Anonymous: "USB Made Simple—Part 6", Jul. 4, 2008, XP055092128, Retrieved from the Internet: URL: http://web.archive.org/web/20080704162946/http://www.usbmadesimple.co.uk/ums_6.htm [retrieved on Dec. 6, 2013] p. 3 p. 6.
International Search Report and Written Opinion—PCT/US2013/062868—ISA/EPO—Feb. 21, 2014.

* cited by examiner

*Primary Examiner* — Tu Nguyen
(74) *Attorney, Agent, or Firm* — Nicholas A. Cole

(57) ABSTRACT

A portable computing device includes a modem and an application processor communicatively coupled by a data bus. The modem communicates a target data throughput in accordance with an identified data call. In response, the application processor determines whether an adjustment of an interrupt latency threshold is warranted to support the target data throughput identified by the modem. Otherwise, the application processor executes no such adjustment. In addition, the modem requests a desired performance of an application processor resource. In response, the application processor adjusts a control input of the application processor controlled resource. A change in a present data transfer session triggers the modem to communicate a revised target data throughput and/or a revised request for a desired performance of an application processor resource.

37 Claims, 6 Drawing Sheets

US 9,043,457 B2

DYNAMIC ADJUSTMENT OF AN INTERRUPT LATENCY THRESHOLD AND A RESOURCE SUPPORTING A PROCESSOR IN A PORTABLE COMPUTING DEVICE

DESCRIPTION OF THE RELATED ART

Technological advances in wireless communication protocols, energy storage density, processor performance and efficiency, and an increase in the density of cellular transmitters enabled the introduction of wireless digital networks in the 1990s. As use of second generation mobile devices became more widespread it became clear that the demand for data services, which include access to the Internet, was growing. The introduction of packet-switching rather than circuit-switching for data transmission with third generation wireless communication systems enabled the increases in data transmission rates required to deliver streaming media to a mobile device.

The demand for high data rate services has helped fuel the expansion of the wireless communication industry. In effort to keep pace, the global wireless infrastructure has become an intricate patchwork of systems operating under different wireless communication protocols. To meet the demand for additional wireless capability, it is expected that the industry will continue to support, rather than consolidate, the number of wireless telecommunications standards, as it is desirable to support communications to many different mobile devices including those dependent on older communication protocols.

Current mobile communication devices include a radio-frequency system that supports wide area network (WAN) communication protocols, local area network (LAN) communication protocols, among others, such as the communication protocol used by a global positioning system (GPS) compliant receiver. These radio-frequency systems include a modem for processing the received signals into appropriate data signals for communication via a data bus to an application processor or memory within the device. The radio-frequency systems identify and manage controlled transitions between various WAN and/or LAN communication signals as conditions change. These controlled transitions include managing the rate at which data is transferred between the radio-frequency system and the application processor or memory. One mechanism for providing such control is aggregating or limiting the number of separate interrupt signals communicated from the radio-frequency subsystem to the application processor. Interrupt signal aggregation reduces the overhead required to process the interrupts.

However, a first shortcoming of present mobile devices results from the aggregation or consolidation of an integer number of interrupts before communicating an interrupt signal. As a result, the interrupt latency threshold is fixed for all data transfers, which under certain high-speed data transfers leads to throughput degradation as the application processor resources are used to process the regular interrupts rather than the data.

Furthermore, the demand for performance results in a corresponding increase in power consumption. The power dissipation in modern processors is rapidly increasing as both clock frequency and the number of transistors required for a given implementation increase. Unfortunately, battery technology has not kept pace with the energy requirements of these data network capable wireless devices, which leads to a design trade-off between application performance and battery life.

The demand for processors that provide both high performance and low power consumption has led to the use of dynamic voltage and frequency scaling (DVFS) in processor designs. DVFS enables trade-offs between power consumption and performance. Processors designed to take advantage of DVFS allow the clock frequency of the processor to be adjusted with a corresponding adjustment in voltage. Reducing clock frequency alone is not useful, since any power savings is offset by an increase in execution time, resulting in no net reduction in the total energy consumed. However, a corresponding reduction in operating voltage results in a proportional savings in power consumed by the processor. Today's processors, especially those with multiple processor cores or processing engines include mechanisms for various sub-systems within the processor to provide information that is used to adjust clock frequency and supply voltage.

However, a second shortcoming of present mobile devices is the application processors adjust system bus clock frequency, core clock frequencies, memory clock frequencies, or other application processor resources absent information about the bandwidth demands of data traffic from the radio-frequency system. Consequently, the frequency of the clock used to support the application processor and or the data bus is set to support the worst case, i.e., the highest data rate capable of being communicated from the radio-frequency system. With today's mobile devices being capable of supporting a vast range of data transfer rates, the clock frequency used to support the application processor is more than adequate to support data transfers from the radio-frequency system under most data transfer conditions.

SUMMARY

An embodiment of a portable computing device includes a modem and an application processor. The modem and application processor are communicatively coupled by at least one data bus. The modem communicates a target data throughput during a data transfer session between the modem and the application processor. In response, the application processor determines from the target data throughput whether an adjustment of an interrupt latency threshold is warranted. When warranted, the application processor adjusts the interrupt latency threshold to support the target data throughput communicated by the modem. Otherwise, the application processor executes no such adjustment. In addition, the modem communicates a request for a desired performance of an application processor resource. In response, the application processor adjusts a control input of the application processor controlled resource. Example, application processor resources include but are not limited to a core specific clock frequency, a memory clock frequency, a data bus clock frequency, among others. A change in the present data transfer session triggers the modem to communicate a revised target data throughput and/or a revised request for a desired performance of an application processor resource.

In an alternative embodiment, the portable computing device includes an application processor that receives both the target data throughput and the request for a desired performance of an application processor resource and in response to the request for a desired performance of the application processor resource considers additional resource performance requests from one or more integrated sub-systems within the application processor to set an optimum resource performance to conserve data consumption while not adversely affecting the user experience.

An embodiment of a method executed on a portable computing device for reducing power consumption, comprises detecting, in a modem, a present data call type; transmitting, from the modem, a target data rate responsive to the data call type; receiving, in an application processor, the target data rate; in the application processor, dynamically adjusting an interrupt latency threshold to a level capable of supporting the target data rate; transmitting, from the modem, a desired performance of an application processor resource, dynamically adjusting the application processor resource to meet the desired performance.

In an alternative embodiment of the method, the application processor dynamically adjusts the application processor resource upon consideration of one or more desired performance requests from integrated sub-systems.

BRIEF DESCRIPTION OF THE DRAWINGS

In the figures, like reference numerals refer to like parts throughout the various views unless otherwise indicated. For reference numerals with letter character designations such as "102a" or "102b", the letter character designations may differentiate two like parts or elements present in the same figure. Letter character designations for reference numerals may be omitted when it is intended that a reference numeral encompass all parts having the same reference numeral in all figures.

DETAILED DESCRIPTION

Figure 1:
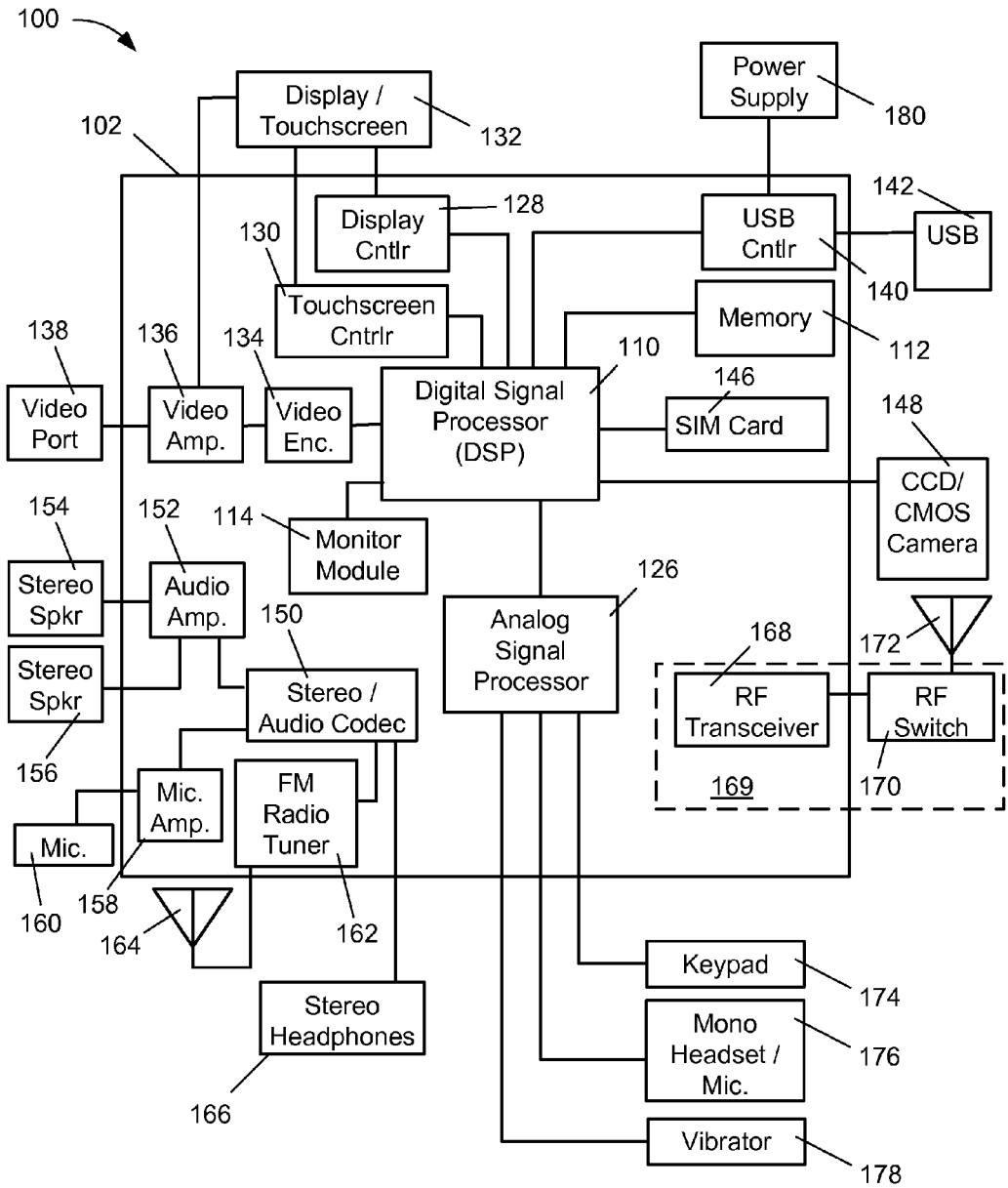
FIG. 1 is a schematic diagram illustrating an embodiment of a portable computing device.

Improvements in the configuration and management of a data call or data transfer session are illustrated and described to address the above-mentioned deficiencies during data transfer sessions or data calls operable on a portable computing device. The improved portable computing device can achieve reductions in power consumption during various data transfer sessions, including but not limited to, file transfers, multimedia streaming, and Internet browsing applications.

The term "exemplary" is used herein to mean "serving as an example, instance, or illustration." Any aspect described herein as "exemplary" is not necessarily to be construed as preferred or advantageous over other aspects.

In this description, the term "application processor" is used to describe a hardware element capable of accessing executable content, such as: object code, scripts, byte code, markup language files, and patches. In addition, such an "application processor" referred to herein, is further capable of accessing data from integral and external memory elements via data input output interfaces. The "application processor" executes the executable content to manage system capabilities, graphics processing and multimedia decoding on the portable computing device.

In this description, the term "portable computing device" is used to describe any device operating on a limited capacity power supply, such as a battery. Although battery operated mobile devices have been in use for decades, technological advances in rechargeable batteries coupled with the advent of third generation ("3G") and fourth generation wireless technology, have enabled numerous mobile devices with multiple capabilities. Therefore, a mobile device could be a cellular telephone, a satellite telephone, a pager, a PDA, a smartphone, a navigation device, a smartbook or reader, a media player, a combination of the aforementioned devices, a laptop computer with a wireless connection, among others.

The term "content" may also include files having executable content, such as: object code, scripts, byte code, markup language files, and patches. In addition, "content" referred to herein, may also include files that are not executable in nature, such as documents that may need to be opened or other data files that need to be accessed.

As used in this description, the terms "logic," "table," "component," "module," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device may be a component. One or more components may reside within a process and/or thread of execution, and a component may be localized on one computer and/or distributed between two or more computers. In addition, these components may execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

The introduction of multiple-core processors and dedicated hardware resources for implementing various functions on a mobile or portable computing device and a continuing desire for improvement in battery life has further complicated the task of dynamically adjusting a portable computing device to reduce power consumption while providing an acceptable end-user experience. In response, an improved portable computing device and methods for dynamically adjusting the same are disclosed. The number of different portable computing devices available, the various communication protocols or standards used to communicate with the devices, the different types of applications available, the different ways that the devices are used, etc., make it clear that no single approach or solution can be adjusted or optimized for all possible operational combinations.

In response, it is proposed to provide systems and methods for dynamically adjusting parameters within a portable computing device to reduce power consumption while not adversely affecting an end user's experience. The system includes an application processor that adjusts an interrupt threshold in response to information provided by a modem coupled to the application processor. The information includes a target data rate for a data call or data transfer session being processed by the modem. It is also proposed to provide an application processor that receives and considers a resource performance request from the modem.

The system can be enabled as hardware or in a combination of software or firmware that is executed by hardware in a portable computing device. The software or firmware can be stored in a non-volatile memory element coupled to one or more processors operable on the mobile device. The software stored in the non-volatile memory element is communicated to and executed by a suitable instruction execution system (microprocessor). A hardware implementation on a mobile device can include any or a combination of the following technologies, which are all well known in the art: discrete electronic components, a discrete logic circuit(s) having logic gates for implementing logic functions upon data signals, an application specific integrated circuit having appropriate logic gates, a programmable gate array(s) (PGA), a field programmable gate array (FPGA), etc.

Referring to FIG. 1, this figure is a diagram of an exemplary, non-limiting aspect of a portable computing device 100 in the form of a wireless telephone. As shown, the portable computing device 100 includes an on-chip system 102 that includes a digital signal processor 110 and an analog signal processor 126 that are coupled together. As illustrated in FIG. 1, a display controller 128 and a touchscreen controller 130 are coupled to the digital signal processor 110. A touchscreen display 132 external to the on-chip system 102 is coupled to the display controller 128 and the touchscreen controller 130.

FIG. 1 further indicates that a video encoder 134, e.g., a phase-alternating line ("PAL") encoder, a sequential couleur avec memoire ("SECAM") encoder, a national television system(s) committee ("NTSC") encoder or any other video encoder, is coupled to the digital signal processor 110. Further, a video amplifier 136 is coupled to the video encoder 134 and the touchscreen display 132. A video port 138 is coupled to the video amplifier 136. As depicted in FIG. 1, a universal serial bus ("USB") controller 140 is coupled to the digital signal processor 110. Also, a USB port 142 is coupled to the USB controller 140. A memory 112 and a subscriber identity module (SIM) card 146 may also be coupled to the digital signal processor 110. Further, as shown in FIG. 1, a digital camera 148 may be coupled to the digital signal processor 110. In an exemplary aspect, the digital camera 148 is a charge-coupled device ("CCD") camera or a complementary metal-oxide semiconductor ("CMOS") camera.

As further illustrated in FIG. 1, a stereo audio CODEC 150 may be coupled to the analog signal processor 126. Moreover, an audio amplifier 152 may be coupled to the stereo audio CODEC 150. In an exemplary aspect, a first stereo speaker 154 and a second stereo speaker 156 are coupled to the audio amplifier 152. FIG. 1 shows that a microphone amplifier 158 may be also coupled to the stereo audio CODEC 150. Additionally, a microphone 160 may be coupled to the microphone amplifier 158. In a particular aspect, a frequency modulation ("FM") radio tuner 162 may be coupled to the stereo audio CODEC 150. Also, an FM antenna 164 is coupled to the FM radio tuner 162. Further, stereo headphones 166 may be coupled to the stereo audio CODEC 150.

FIG. 1 further indicates that a radio frequency ("RF") transceiver 168 may be coupled to the analog signal processor 126. An RF switch 170 may be coupled to the RF transceiver 168 and an RF antenna 172. The RF switch 170 and RF transceiver 168 are components of a RF sub-system 169 which will be described in association with FIG. 3. As shown in FIG. 1, a keypad 174 may be coupled to the analog signal processor 126. Also, a mono headset with a microphone 176 may be coupled to the analog signal processor 126. Further, a vibrator device 178 may be coupled to the analog signal processor 126. FIG. 1 also shows that a power supply 180, for example a battery, is coupled to the on-chip system 102. In a particular aspect, the power supply includes a rechargeable DC battery or a DC power supply that is derived from an alternating current ("AC") to DC transformer that is connected to an AC power source.

FIG. 1 also shows that the portable computing device 100 may include a monitor module 114. The monitor module 114 communicates with multiple operational sensors distributed throughout the on-chip system 102 and with the digital signal processor 110 of the portable computing device 100. As depicted in FIG. 1, the touchscreen display 132, the video port 138, the USB port 142, the camera 148, the first stereo speaker 154, the second stereo speaker 156, the microphone 160, the FM antenna 164, the stereo headphones 166, the RF switch 170, the RF antenna 172, the keypad 174, the mono headset 176, the vibrator 178, and the power supply 180 are external to the on-chip system 322. However, it should be understood that the monitor module 114 may also receive one or more indications or signals from one or more of these external devices by way of the analog signal processor 126 and the digital signal processor 110 to aid in the real time management of the resources operable on the portable computing device 100.

Figure 3:
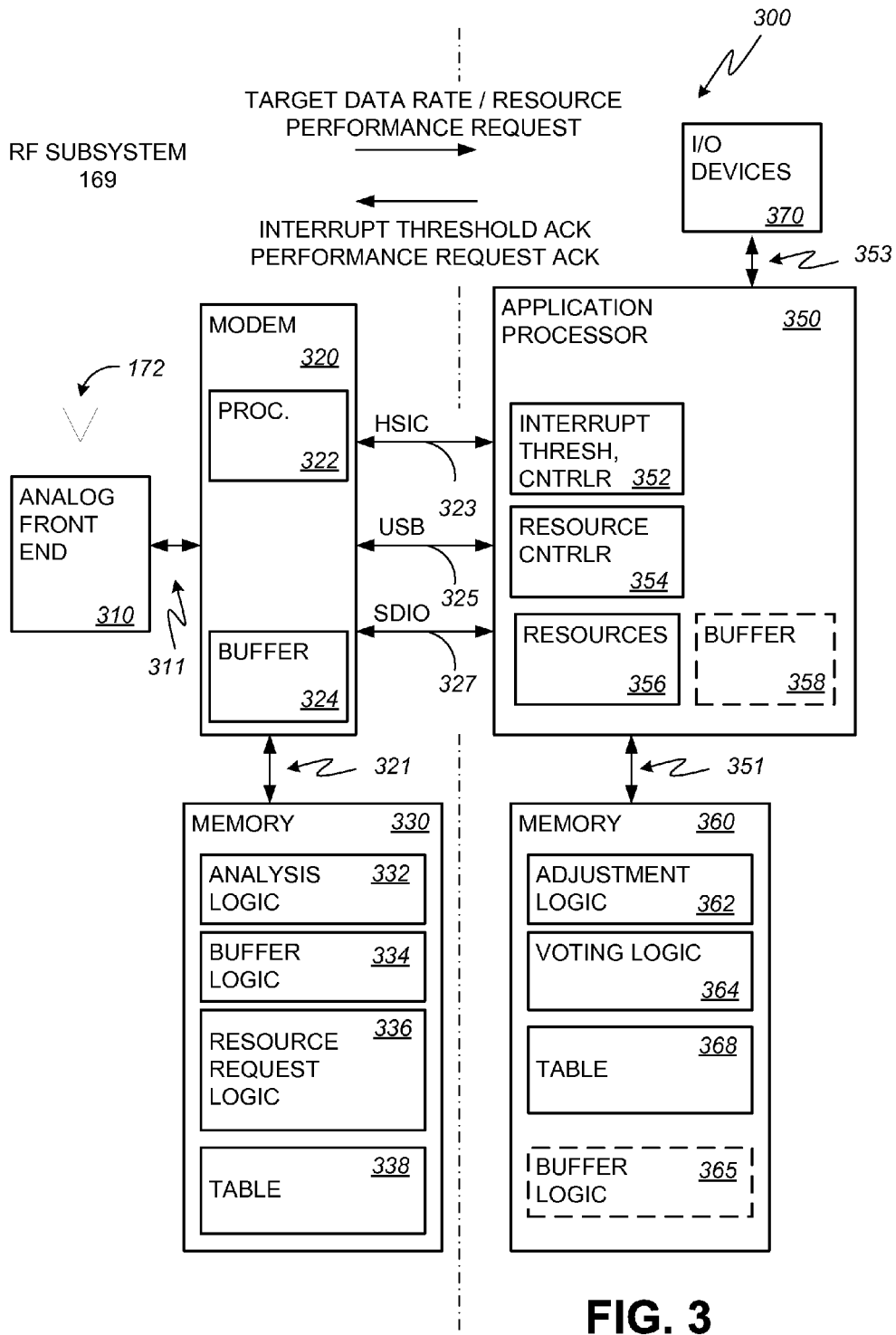
FIG. 3 is a schematic diagram illustrating features of the portable computing device of FIG. 1.

In a particular aspect, one or more of the method steps described herein may implemented by executable instructions and parameters stored in the memory 112. These instructions may be executed by the digital signal processor 110, the analog signal processor 126, or another processor, to perform the methods described herein. For example, as shown in FIG. 3, a modem within the RF subsystem 169 is associated with a respective memory for executing instructions executed by a processor in the modem. In addition, each of the processors, 110, 126, the memory 112, the instructions stored therein, or a combination thereof may perform one or more of the method steps described herein.

Figure 2:
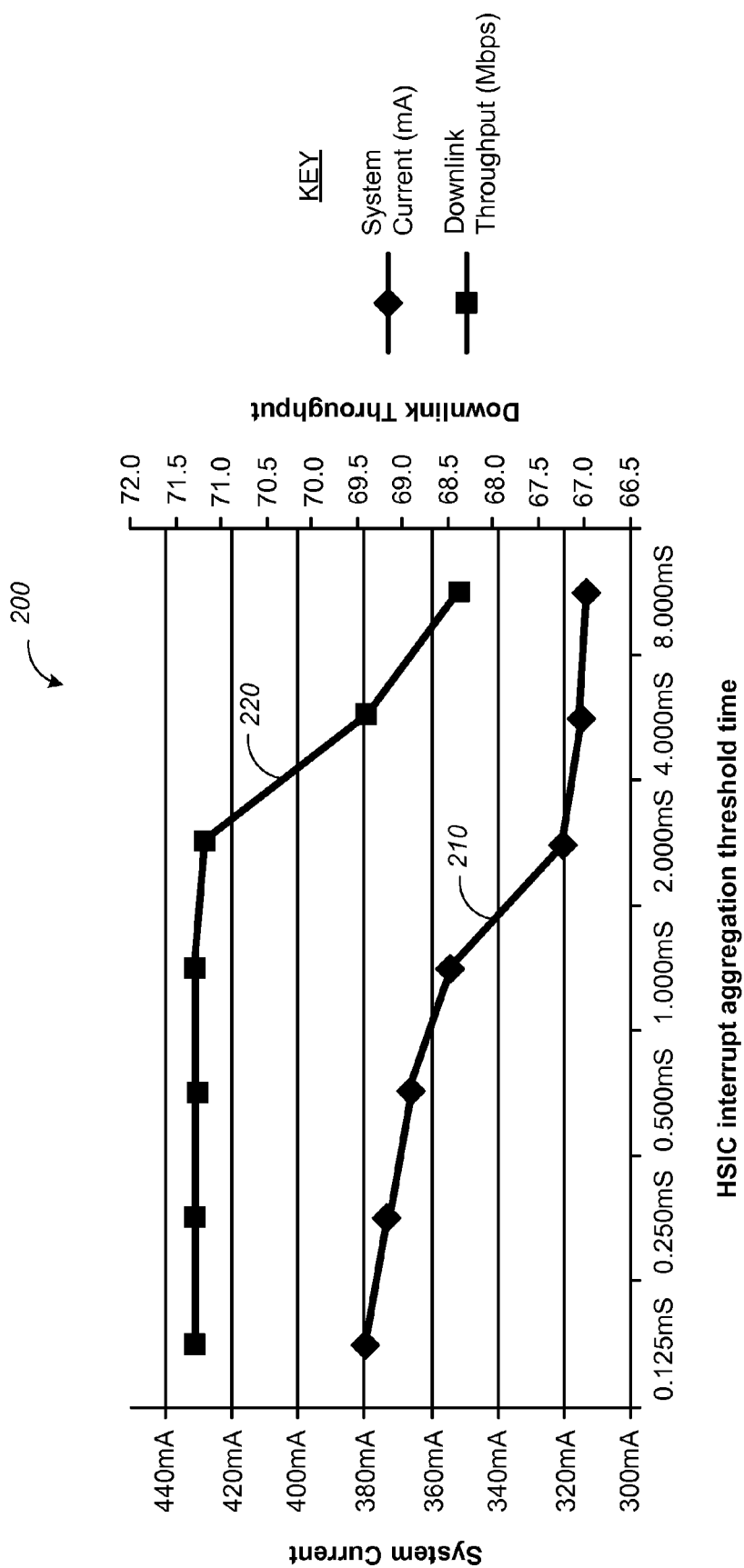
FIG. 2 is a graph illustrating both power consumption and data throughput between a modem and an application processor as a function of an interrupt aggregation threshold.

FIG. 2 is a graph 200 illustrating both power consumption and data throughput as a function of interrupt aggregation threshold in an example PCD. The ordinate or x-axis is indicative of an interrupt aggregation threshold in milliseconds. The abscissa or y-axis, as indicated on the left-side scale, is indicative of power consumption as determined by measuring battery current for each test case or data point. In addition, the abscissa or y-axis, as indicated on the right-side scale, is further indicative of data throughput between a modem and an application processor in the portable computing device. Trace 210 reveals that as the interrupt aggregation threshold increases, the power consumed by the portable computing device, as determined by the battery current, decreases. However, trace 220 reveals that as the interrupt aggregation threshold increases from about 0.125 mS to about 2.000 mS, the data throughput is nearly constant, while for an interrupt aggregation threshold greater than about 2.000 mS, the data throughput decreases in a linear manner.

Accordingly, it has been determined that improvements in power consumption of a portable computing device can be realized by controllably adjusting an interrupt aggregation threshold. This reduction in consumed power can be realized without being noticed by an end user up to about 6.000 mS. For example, for one test case, using an interrupt aggregation threshold of about 0.125 mS resulted in a battery current of 380 mA. By increasing the interrupt aggregation threshold to about 2.000 mS the battery current decreases by about 60 mA absent any change in the data throughput. Over the range from about 2.000 mS to about 6.000 mS, the additional reduction in battery current is not as dramatic but is still significant with only about a 3% data throughput reduction.

FIG. 3 is a schematic diagram illustrating features of the portable computing device 100 of FIG. 1. More specifically, elements or features of an improved radio-frequency subsystem 169 are illustrated to the left of a dashed line near the center of the illustration, while elements of an improved processing system appear to the right of the dashed line. The RF subsystem 169 includes antenna 172, analog front end 310, modem 320 and memory 330. The operation of the antenna 172 and the various power amplifiers, switches and or filters implemented therein to enable bi-directional transmission of signals are known to those skilled in the art. Such signals are communicated between the analog front end 310 and modem 320 over connection 311. The modem 320 includes a processor 322, a buffer 324 and input/output drivers (not shown) for enabling signal and data communications along a data bus 321, which couples the modem 320 to the memory 330.

Additional input/output drivers and supporting logic (not shown) enable signal and data communications along a high-speed inter-chip (HSIC) compliant bus 323 between the modem 320 and corresponding circuit elements and supporting logic in the application processor 350. The details of operation of a HSIC compliant bus are known to those skilled in the art.

Other input/output drivers and supporting logic (not shown) enable signal and data communications along a universal serial bus compliant connection 325 between the modem 320 and corresponding circuit elements and supporting logic in the application processor 350. The details of operation of a universal serial bus compliant data connection are known to those skilled in the art.

Still other input/output drivers and supporting logic (not shown) enable signal and data communications along a secure digital input output (SDIO) compliant bus 327 between the modem 320 and corresponding circuit elements and supporting logic in the application processor 350. The details of operation of a SDIO compliant bus are known to those skilled in the art.

The processor 322 can be any processor that can access the memory 330 and execute the executable instructions stored in each of the identified logic modules to control the operation and functionality of the modem 320. The memory 330 can be volatile or non-volatile memory, and in an embodiment, is a non-volatile memory that stores analysis logic 332, buffer logic 334, resource request logic 336 and a data table 338. It should be understood that the memory 330 may have additional capacity for storing data or additional logic.

The analysis logic 332 includes executable instructions that enable the modem 320 to determine conditions concerning a desired data call or data transfer between the modem 320 and the application processor 350. That is, the analysis logic 332 directs the modem to detect or otherwise identify a present data call type. The analysis logic 332 further enables or directs the processor 322 to access data stored within table 338 to identify a target data rate in accordance with the identified data call type.

The buffer logic 334 includes executable instructions that enable the modem 320 to determine conditions concerning a desired data call or data transfer between the modem 320 and the application processor 350 that are suitable for temporarily storing received data in buffer 324 before communicating the same to the application processor 350 or the memory 360. For example, when the HSIC compliant bus 323 is available and the data call type is indicative of a target data transfer rate significantly less than the maximum rate that the HSIC compliant bus 323 can support, the buffer logic 334 will recognize the same and direct the processor 322 to temporarily store the received data in 324 until a desired buffer capacity is accumulated in the buffer 324. Thereafter, the buffer logic 334 manages the transmission of the buffered data to the input output drivers and supporting circuits associated with the HSIC bus 323 to complete the data transfer in an efficient manner.

The resource request logic 336 includes executable instructions that enable the modem 320 to determine conditions concerning a desired data call or data transfer between the modem 320 and the application processor 350 and generate one or more votes or requests for performance levels of resources 356 in the application processor 350. Resources 356 generally include system, bus and memory clocks with adjustable clock frequencies although any parameter controlled by the application processor 350 could be identified and a desired performance level for the same communicated by the processor 322 in accordance with the resource request logic 336. The resource request logic 336 may further include executable instructions that direct the processor 336 to access data stored in table 338 to generate desired resource performance level requests.

The improved processing system includes application processor 350, memory 360 and input/output or I/O devices 370. The application processor 350 includes a multi-core processor (not shown), an interrupt threshold controller 352, resource controller 354, resources 356 and input/output drivers (not shown) for enabling signal and data communications along a data bus 351, which couples the application processor 350 to the memory 360.

Additional input/output drivers and supporting logic (not shown) enable signal and data communications along communication bus 353 and corresponding circuit elements and supporting logic in the I/O devices 370. The details of operation of a data communication bus are known to those skilled in the art.

The application processor 350 can be any processor that can access the memory 360 and execute the executable instructions stored in each of the identified logic modules to control the operation and functionality of the improved processing system 300. The memory 360 can be volatile or non-volatile memory, and in an embodiment, is a non-volatile memory that stores adjustment logic 362, voting logic 364 and a data table 368. It should be understood that the memory 360 may have additional capacity for storing data or additional logic.

The adjustment logic 362 includes executable instructions that enable the application processor 350 to receive a target data rate for a present data call or transfer to be supported by the modem 320 and the application processor 350 over one of the available busses or another suitable bus (not shown). In addition, the adjustment logic 362 issues an appropriate control signal to the interrupt threshold controller 352 arranged in the application processor 352. That is, the adjustment logic 362 receives the target data rate and issues a suitable control signal to adjust an interrupt latency threshold to a level capable of adequately supporting the target data rate. The adjustment logic 362 further enables or directs the application processor 350 to access data stored within table 368 to identify an optimum interrupt latency threshold.

The voting logic 364 includes executable instructions that enable and or direct the application processor 350 to determine conditions concerning any of a number of various conditions on the portable computing device 100 including the use of I/O devices 370, and other resources 356 supporting the application processor 350. In addition, the voting logic 364 receives the one or more votes or requests for performance levels of resources 356 supporting the application processor 350 as generated and communicated by the modem 320. The voting logic 364 receives the information responsive to present conditions throughout the portable computing device including those issued from the modem before determining a suitable control signal adjustment or set of control signal adjustments that are communicated to the resource controller 354, which makes the directed adjustments. The voting logic 364 further enables or directs the application processor 350 to access data stored within the table 368 to identify appropriate control signal adjustments. Such adjustments may include decreasing the clock frequency of a system, bus, or memory clock supporting the application processor 350.

Figure 4:
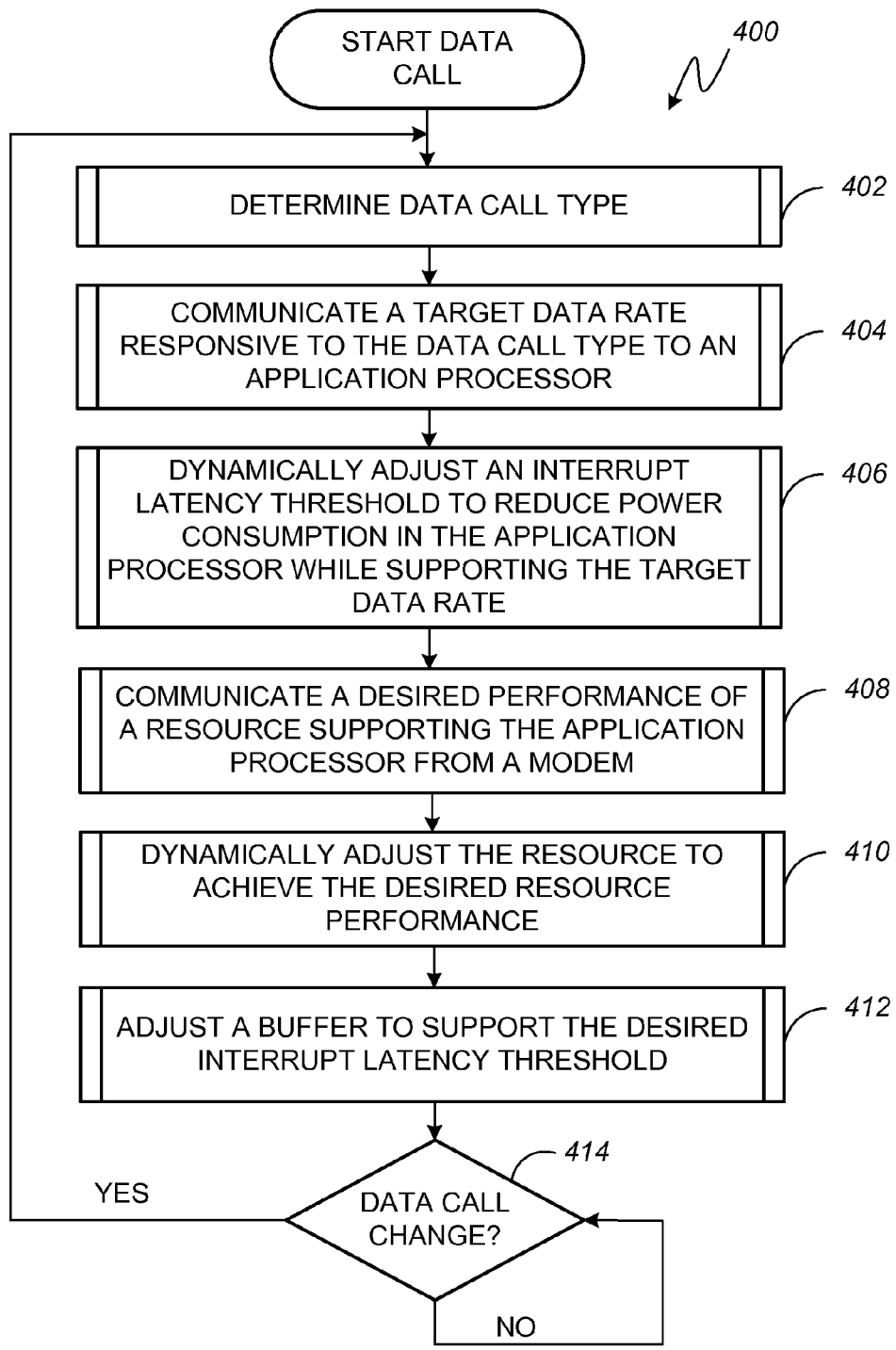
FIG. 4 is a flow chart illustrating an embodiment of a method operable on the portable computing device of FIG. 1

FIG. 4 is a flow chart illustrating an embodiment of a method 400 operable on the portable computing device 100 of FIG. 1. The method 400 begins when a data call or data transfer operation begins within the modem 320. In block 402, the modem 320 identifies or determines a data call type. Example data calls may include the necessary operations for transferring a file transfer, browsing a website, streaming multimedia with the portable computing device 100. In block 404, the modem 320 communicates a target data rate responsive to the data call type. As explained, the modem 320 communicates this information in an out-of-band data or signal information transfer over a communication bus that couples the modem 320 with the application processor 350. In response, the application processor 350, as indicated in block 406, dynamically adjusts an interrupt latency threshold to reduce power consumption in the application processor 350 while supporting the target data rate for the underlying data call. As indicated in block 408, the modem 320 further communicates a desired performance for an identified resource supporting the application processor 350. As shown in block 410, the application processor 350 adjusts the resource to achieve the desired resource performance. When data call conditions change, as indicated by the flow control arrow labeled "YES" exiting decision block 412, the method 400 returns to block 402. Otherwise, the portable computing device 100 continues to operate under the present configuration for the remainder of the data call.

Figure 5:
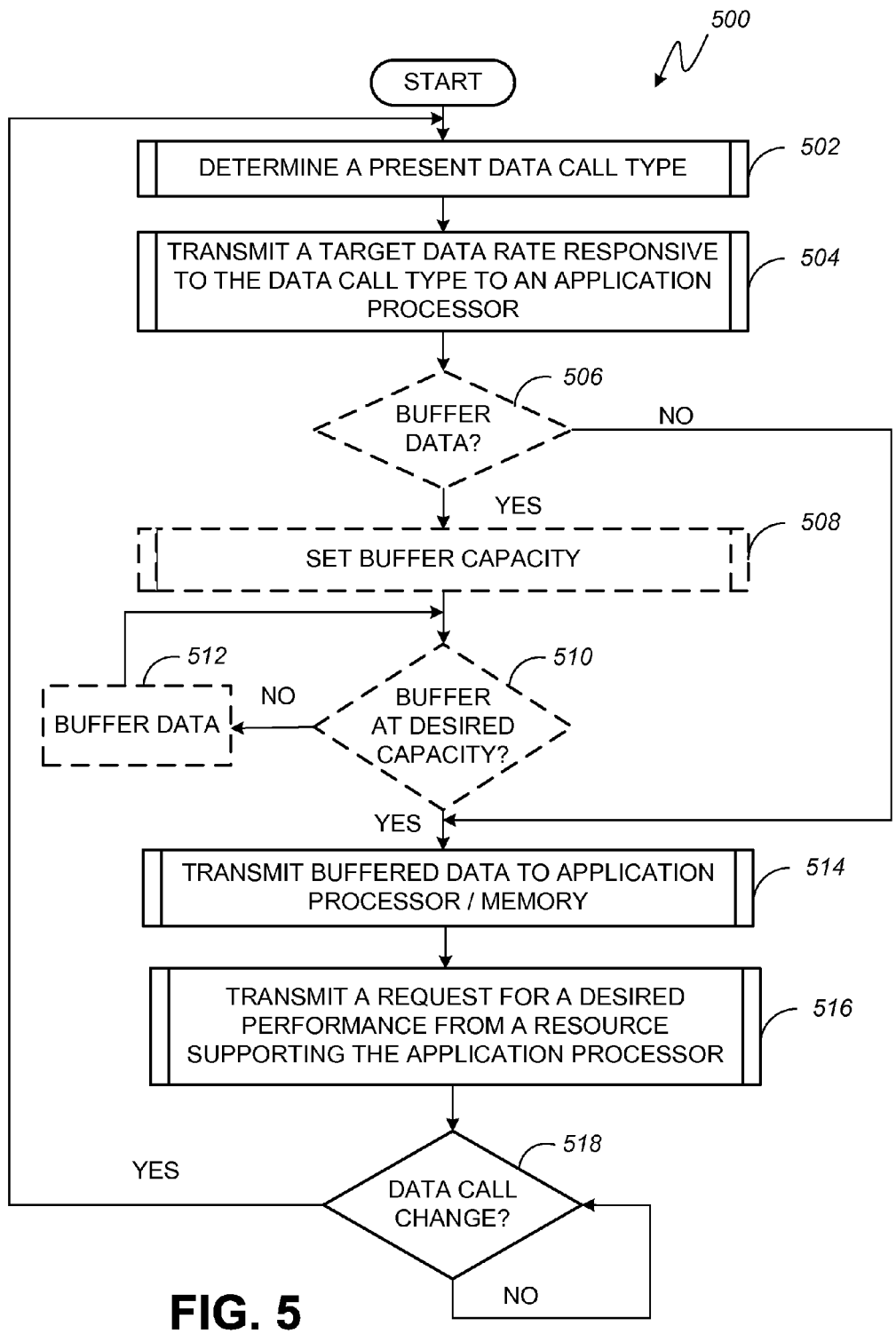
FIG. 5 is a flow chart illustrating an embodiment of a method operable within the modem of FIG. 3.

FIG. 5 is a flow chart illustrating an embodiment of a method 500 operable within the modem of FIG. 3. As described, the modem 500 retrieves and executes the executable instructions stored in each of the analysis logic 332, the buffer logic 334, the resource request logic 336 and the table 338 to implement the described functions. The method 500 begins with block 502, where the modem 320 when executing the analysis logic 332 determines a present data call type. Thereafter, the modem 320 executes the analysis logic 332 in conjunction with information in table 338 to identify and transmit a target data rate to the application processor 350.

The buffer logic 334 is optionally executed by the modem 320 to enable the intermediate portion of the flow diagram. For example, the method 500 continues with decision block 506, where the modem 320 determines whether data call conditions are suitable for buffering or temporarily holding data in buffer 324 before communicating the same in a burst to the application processor 350 or memory 360 via one of the available communication busses. When data call conditions or other conditions on the portable computing device 100 are not suitable for buffering data in the buffer 324, as indicated by the flow control arrow labeled "NO" exiting the decision block 506, the method 500 continues with block 514. When it is determined that data is to be buffered, a buffer capacity is configured in block 508. Note that the threshold capacity may be stored in table 338 or another data store within the memory 330. The threshold capacity will generally be determined from the target data rate and the bandwidth of the bus being used for the data transfer. The buffer capacity is a parameter that indicates to the modem 320 when it should begin communicating the information stored in buffer 324 to the receiving element via the bus. In decision block 510, it is determined whether the buffer 324 has reached the threshold capacity configured in block 508. When the threshold capacity has not been reached, additional data is buffered as indicated in block 512. Otherwise, the method continues with block 514, where the buffered data is transmitted to the receiving element. In block 516, the modem 320 executing the resource request logic 336 transmits a request for a desired performance level from a resource supporting the application processor 350. When data call conditions change, as indicated by the flow control arrow labeled "YES" exiting decision block 518, the method 500 returns to block 502. Otherwise, the portable computing device 100 continues to operate under the present configuration for the remainder of the data call.

Figure 6:
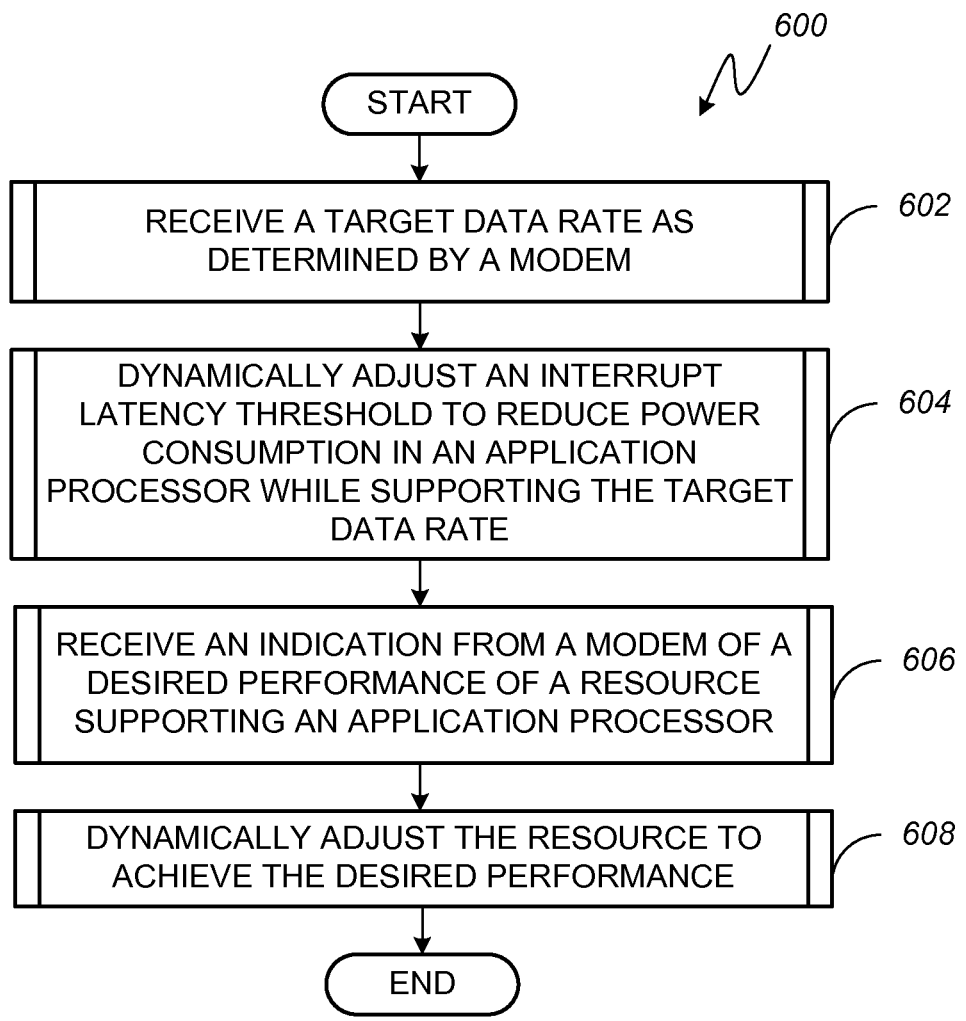
FIG. 6 is a flow chart illustrating an embodiment of a method operable within the application processor of FIG. 3.

FIG. 6 is a flow chart illustrating an embodiment of a method 600 operable within the application processor 350 of FIG. 3. The method 600 begins with block 602, where the application processor 350 received a target data rate from the modem 320. Thereafter, as shown in block 604, the application processor 350 dynamically adjusts an interrupt latency threshold to reduce power consumption in the application processor 350 while supporting the target data rate. In block 606, the application processor 350 receives an indication from the modem 320 of a desired performance of a resource supporting the application processor 350. Thereafter, as indicated in block 608, the application processor 350 adjusts the resource to achieve the desired performance.

As indicated, resources 356 may include one or more a data bus clock, a system bus clock, a memory clock, among others. When configured with a resource controller 354 and executing voting logic 364, the application processor 350 may receive and consider the desired performance level for an identified supporting resource from the modem 320 among a host of additional requests or information concerning one or more applications presently being executed by the application processor 350 to make an informed determination as to a performance level suitable for conserving power while also not adversely effecting a user experience.

Certain steps in the processes or process flows described in this specification naturally precede others for the invention to function as described. However, the invention is not limited to the order of the steps described if such order or sequence does not alter the functionality of the invention. That is, it is recognized that some steps may performed before, after, or parallel (substantially simultaneously with) other steps without departing from the disclosed system and method. In some instances, certain steps may be omitted or not performed without departing from the method as understood by one of ordinary skill in the art. Further, words such as "thereafter," "then," "next," etc. are not intended to limit the order of the steps. These words are simply used to guide the reader through the description of the exemplary method.

In view of the disclosure above, one of ordinary skill in programming is able to write computer code or identify appropriate hardware and/or circuits to implement the disclosed invention without difficulty based on the flow charts and associated description in this specification, for example. Therefore, disclosure of a particular set of program code instructions or detailed hardware devices is not considered necessary for an adequate understanding of how to make and use the invention. The functionality of the claimed processes is explained in more detail in the above description and in conjunction with FIGS. 4-6, which illustrate various process flows.

In one or more exemplary aspects, the functions described may be implemented in hardware, software, firmware, or any combination thereof. If implemented in software, the functions may be stored on or transmitted as one or more instructions or code on a computer-readable medium. Computer-readable media include both computer storage media and communication media including any medium that facilitates transfer of a computer program from one place to another. A storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer.

Also, any connection is properly termed a computer-readable medium. For example, if the software is transmitted from a website, server, or other remote source using a coaxial cable, fiber optic cable, twisted pair, digital subscriber line ("DSL"), or wireless technologies such as infrared, radio, and microwave, then the coaxial cable, fiber optic cable, twisted pair, DSL, or wireless technologies such as infrared, radio, and microwave are included in the definition of medium.

Disk and disc, as used herein, includes compact disc ("CD"), laser disc, optical disc, digital versatile disc ("DVD"), floppy disk and blu-ray disc where disks usually reproduce data magnetically, while discs reproduce data optically with lasers. Combinations of the above should also be included within the scope of computer-readable media.

Therefore, although selected aspects have been illustrated and described in detail, it will be understood that various substitutions and alterations may be made therein without departing from the scope of the present systems, methods and computer program products, as defined by the following claims.

What is claimed is:

1. A method for reducing power consumption in a portable computing device, the method comprising:
   detecting, in a modem, a present data call type;
   identifying, in the modem, a target data rate stored in the modem that is responsive to the detected data call type;
   transmitting, from the modem, the target data rate responsive to the data call type;
   receiving, in an application processor, the target data rate;
   using the application processor to dynamically adjust an interrupt latency threshold to a level capable of supporting the target data rate;
   transmitting, from the modem, a request for desired performance levels of a clock resource used by the application processor; and
   using the application processor to dynamically adjust a performance level of the clock resource based on the request for desired performance levels received from the modem.

2. The method of claim 1, wherein the transmitting steps are enabled by an integrated circuit interconnect compliant with the universal serial bus standard that couples the modem to the application processor.

3. The method of claim 1, wherein the transmitting steps are enabled by a bus compliant with the universal serial bus industry standard.

4. The method of claim 1, wherein the transmitting steps are enabled by a bus compliant with the secure digital card interface standard.

5. The method of claim 1, further comprising:
   generating, in an application processor, an acknowledgement that the target data rate has been received; and
   communicating the acknowledgement.

6. The method of claim 1, further comprising:
   storing, in a memory coupled to the modem, a table of supported data call types and corresponding target data rates.

7. The method of claim 1, wherein an interrupt threshold controller integral to or coupled to the application processor dynamically adjusts the interrupt latency threshold.

8. The method of claim 7, wherein the interrupt threshold controller comprises at least one of an executable instruction and hardware.

9. The method of claim 1, wherein a resource controller integral to or coupled to the application processor dynamically adjusts a control input associated with the resource.

10. The method of claim 9, wherein the resource controller comprises at least one of an executable instruction and hardware.

11. A system for dynamically adjusting an interrupt latency threshold on a portable computing device, the system comprising:
    a modem operable for:
      detecting a present data call type;
      identifying a target data rate stored therein that is responsive to the detected data call type;
      transmitting the target data rate responsive to the data call type; and
      transmitting a request for desired performance levels of a clock resource used by an application processor;
    a data bus coupled to the modem; and
    an application processor coupled to the data bus and operable for:
      receiving the target data rate;
      dynamically adjusting an interrupt latency threshold to support a data transfer session with the modem at the target data rate; and
      dynamically adjusting a performance level of the clock resource based on the request for desired performance levels provided by the modem.

12. The system of claim 11, wherein the data bus comprises an integrated circuit interconnect compliant with the universal serial bus standard.

13. The system of claim 11, wherein the data bus is compliant with the universal serial bus industry standard.

14. The system of claim 11, wherein the data bus is compliant with the secure digital card interface standard.

15. The system of claim 11, wherein the application processor is arranged to acknowledge receipt of the target data rate.

16. The system of claim 11, further comprising:
    a memory coupled to the modem, the memory including a table of supported data call types and corresponding target data rates.

17. The system of claim 11, further comprising:
    an interrupt threshold controller integral to or coupled to the application processor, wherein the interrupt controller adjusts the interrupt latency threshold over a range of values in which the data throughput over the data bus has been shown to remain constant.

18. The system of claim 17, wherein the interrupt threshold controller comprises at least one of an executable instruction and hardware.

19. The system of claim 11, further comprising:
    a resource controller integral to or coupled to the application processor, wherein the resource controller adjusts a control input associated with the resource.

20. The system of claim 19, wherein the resource controller comprises at least one of an executable instruction and hardware.

21. The system of claim 11, wherein the portable computing device comprises at least one of a mobile telephone, a personal digital assistant, a pager, a smartphone, a navigation device, and a hand-held computer with a wireless connection or link.

22. A portable computer system, comprising:
bus means for enabling data transfers between a modem and an application processor;
modem processor means for identifying a data call type;
wherein the modem processor means determines a target data rate stored in the modem that is responsive to the data call type;
application processor means for dynamically adjusting an interrupt latency threshold to a level capable of supporting the target data rate;
wherein the modem processor means identifies a request for desired performance levels of a clock resource used by the application processor by a processing element other than the application processor; and
wherein the application processor means dynamically adjusts a performance level of the clock resource based on the desired performance levels received from the modem processor means.

23. The system of claim 22, wherein the bus means for enabling data transfers comprises an integrated circuit interconnect compliant with the universal serial bus standard.

24. The system of claim 22, wherein the bus means for enabling data transfers comprises a bus compliant with the universal serial bus industry standard.

25. The system of claim 22, wherein the bus means for enabling data transfers comprises a bus compliant with the secure digital card interface standard.

26. The system of claim 22, wherein the application processor means generates an acknowledgement of receipt of the target data rate.

27. The system of claim 22, wherein the application processor means generates an acknowledgment of receipt of the desired performance.

28. The system of claim 22, wherein the application processor means for dynamically adjusting the interrupt latency threshold is constrained to a range of values selected such that data throughput over the data bus is not degraded.

29. The system of claim 28, wherein the application processor means for dynamically adjusting the interrupt latency threshold comprises at least one of an executable instruction and hardware.

30. The system of claim 22, wherein the application processor means for dynamically adjusting the resource to meet the desired performance comprises at least one of an executable instruction and hardware.

31. The system of claim 22, wherein each of the claimed bus means, modem processor means and application processor means is operable on a portable computing device comprising at least one of a mobile telephone, a personal digital assistant, a pager, a smartphone, a navigation device, and a hand-held computer with a wireless connection or link.

32. A computer program product comprising a non-transitory computer usable medium having a computer readable program code embodied therein, said computer readable program code adapted to be executed to implement a method for reducing power consumption in a portable computing device, the method comprising:
detecting, in a modem, a present data call type;
identifying, in the modem, a target data rate stored in the modem that is responsive to the detected data call type;
transmitting, from the modem, the target data rate responsive to the data call type; and
transmitting, from the modem, a request for desired performance levels of a clock resource used by an application processor in communication with the modem via a data bus.

33. The computer program product of claim 32, wherein the program code implementing the method further comprises:
determining, in the modem, a change in the data call type; and
repeating the detecting and both transmitting steps.

34. The computer program product of claim 32, wherein the program code implementing the method is executed on a portable computing device comprising at least one of a mobile telephone, a personal digital assistant, a pager, a smartphone, a navigation device, and a hand-held computer with a wireless connection or link.

35. A computer program product comprising a non-transitory computer usable medium having a computer readable program code embodied therein, said computer readable program code adapted to be executed to implement a method for reducing power consumption in a portable computing device, the method comprising:
receiving a target data rate responsive to a detected data call type communicated from a modem;
dynamically adjusting an interrupt latency threshold to support a data transfer session with the modem at the target data rate;
receiving a request for desired performance levels for a clock resource used by an application processor from the modem; and
dynamically adjusting a control input associated with the clock resource to achieve the desired performance levels as provided by the modem.

36. The computer program product of claim 35, wherein the program code implementing the method further comprises:
receiving a second desired performance for a resource used by the application processor from a sub-system of the application processor; and
dynamically adjusting a control input associated with the resource responsive to the desired performance as provided by the modem and the second desired performance as indicated by a sub-system of an application processor.

37. The computer program product of claim 36, wherein the program code implementing the method is executed on a portable computing device comprising at least one of a mobile telephone, a personal digital assistant, a pager, a smartphone, a navigation device, and a hand-held computer with a wireless connection or link.

* * * * *